(12) United States Patent
Velasco

(10) Patent No.: US 12,443,698 B2
(45) Date of Patent: Oct. 14, 2025

(54) CONFIGURING A CLIENT IMMUTABLE IDENTIFICATION PROFILE

(71) Applicant: International Business Machines Corporation, Armonk, NY (US)

(72) Inventor: Marc Velasco, Orange, CA (US)

(73) Assignee: International Business Machines, Armonk, NY (US)

( * ) Notice: Subject to any disclaimer, the term of this patent is extended or adjusted under 35 U.S.C. 154(b) by 730 days.

(21) Appl. No.: 17/672,669

(22) Filed: Feb. 15, 2022

(65) Prior Publication Data

US 2023/0259609 A1 Aug. 17, 2023

(51) Int. Cl.
G06F 21/45 (2013.01)
H04L 9/40 (2022.01)

(52) U.S. Cl.
CPC .............. *G06F 21/45* (2013.01); *H04L 63/08* (2013.01)

(58) Field of Classification Search
CPC ..... G06F 21/45; H04L 63/08; H04L 63/0876; H04L 63/102
USPC .............................................................. 726/6
See application file for complete search history.

(56) References Cited

U.S. PATENT DOCUMENTS

| | | | |
|---|---|---|---|
| 8,375,024 B2 | 2/2013 | Goeldi | |
| 11,605,387 B1 * | 3/2023 | Muralitharan | G10L 15/22 |
| 11,888,837 B1 * | 1/2024 | Vera | H04L 9/3213 |
| 2018/0046784 A1 | 2/2018 | Flores et al. | |
| 2018/0365562 A1 | 12/2018 | Volkova | |
| 2020/0274885 A1 | 8/2020 | Cselle et al. | |
| 2021/0203661 A1 | 7/2021 | Sankey | |
| 2022/0180358 A1 * | 6/2022 | Iyer | G06Q 20/3829 |
| 2022/0318654 A1 * | 10/2022 | Lin | G06N 5/04 |

FOREIGN PATENT DOCUMENTS

| | | | | |
|---|---|---|---|---|
| WO | 2020044211 A1 | 3/2020 | | |
| WO | WO-2022167092 A1 * | 8/2022 | | H04W 12/041 |

OTHER PUBLICATIONS

Mell, Peter et al. The NIST Definition of Cloud Computing. National Institute of Standards and Technology, U.S. Department of Commerce, NIST Special Publication 800-145, Sep. 2011, 7 pages.

* cited by examiner

*Primary Examiner* — Aubrey H Wyszynski
(74) *Attorney, Agent, or Firm* — Elliot J. Shine

(57) ABSTRACT

Techniques are described relating to client profile management in a managed services domain of a cloud computing environment. The techniques enable client profile configuration across multiple client application accounts and/or multiple client devices. An associated computer-implemented method includes facilitating creation of an immutable identification profile associated with a client in the context of a client-associated request to access a first content service application. The immutable identification profile associated with the client includes an immutable identification value and an immutable identification credential set. The computer-implemented method further includes receiving notification of a client-associated request to access a subsequent content service application and transmitting the immutable identification profile associated with the client to the subsequent content service application based upon connectivity to aggregator service functionality.

20 Claims, 7 Drawing Sheets

CONFIGURING A CLIENT IMMUTABLE IDENTIFICATION PROFILE

BACKGROUND

The various embodiments described herein generally relate to client identity management. More specifically, the various embodiments describe techniques of configuring an immutable identification profile associated with the client in a managed services domain of a cloud computing environment.

SUMMARY

The various embodiments described herein provide techniques of client identity management. An associated computer-implemented method includes facilitating creation of an immutable identification profile associated with a client in the context of a client-associated request to access a first content service application. The immutable identification profile associated with the client includes an immutable identification value and an immutable identification credential set. The computer-implemented method further includes receiving notification of a client-associated request to access a subsequent content service application and transmitting the immutable identification profile associated with the client to the subsequent content service application based upon connectivity to aggregator service functionality. In an embodiment, the computer-implemented method includes attaching the immutable identification profile associated with the client to any content service application data related to the client. In an additional embodiment, the computer-implemented method includes archiving content service application data related to the client based upon the immutable identification profile associated with the client. In a further embodiment, the computer-implemented method includes, responsive to a client-initiated search query, searching content service application data based upon the immutable identification profile associated with the client.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited method. One or more further embodiments pertain to a system having at least one processor and a memory storing an application program, which, when executed on the at least one processor, performs an operation including one or more steps of the above recited computer-implemented method and/or implements one or more embodiments associated with the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
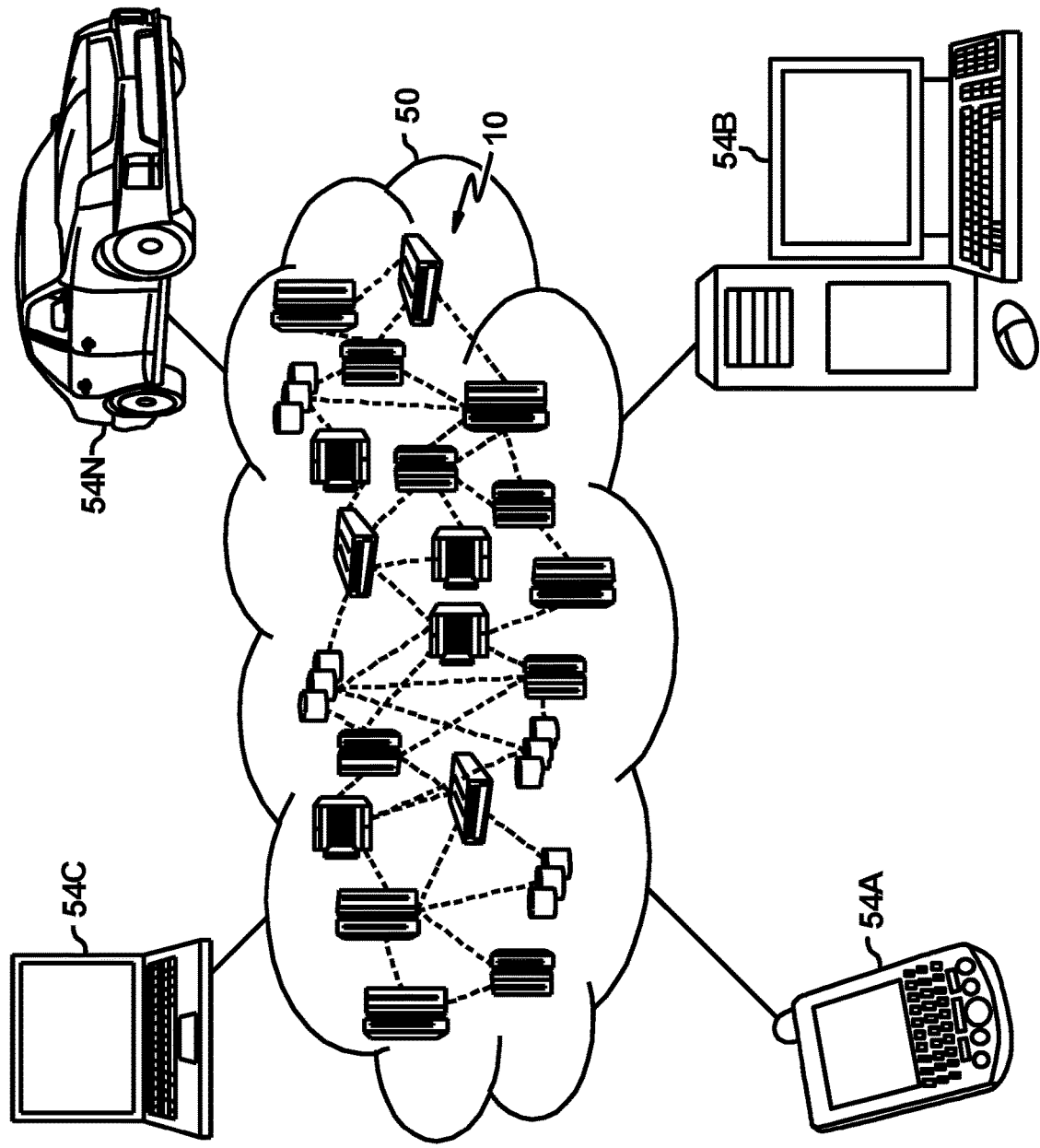
FIG. 1 depicts a cloud computing environment, according to one or more embodiments.

The various embodiments described herein are directed to techniques of configuring a client immutable identification profile in a managed services domain of a cloud computing environment. In the context of the various embodiments, a client immutable identification profile is a profile representative of a client in the context of content service application activity. A client immutable identification profile associates a client with relevant content service application data and further facilitates client data integrity and access integrity by maintaining client security credentials and/or client data access credentials. The various embodiments enable configuration of the client immutable identification profile to manage client activity across multiple content service application accounts and/or across multiple devices.

The various embodiments may have advantages over conventional techniques. The various embodiments improve computer technology through management of a client immutable identification profile that facilitates archiving of client-related application data, including application access activity. Archiving client-related content service application data based upon the client immutable identification profile enables aggregation of client-related application data across multiple content service applications and/or across multiple client devices. Archiving client-related content service application data based upon the client immutable identification profile further enables maintenance of a provenance and lineage record associated with client access and management of content service application data. The various embodiments further facilitate reconciliation of any unconfirmed client account with the client immutable identification profile. The various embodiments process unconfirmed client accounts in order to preserve integrity of the client immutable identification profile, in part by ensuring that client identification aspects cannot be erroneously claimed or circumvented by a third party. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to configuration of a client immutable identification profile in a managed services domain. However, it is to be understood that the techniques described herein may be adapted to a variety of purposes in addition to those specifically described herein. Accordingly, references to specific embodiments are included to be illustrative and not limiting.

The various embodiments described herein may be provided to end users through a cloud computing infrastructure. It is to be understood that although this disclosure includes a detailed description on cloud computing, implementation of the teachings recited herein is not limited to a cloud computing environment. Rather, the various embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Thus, cloud computing allows a user to access virtual computing resources (e.g., storage, data, applications, and even complete virtualized computing systems) in the cloud, without regard for the underlying physical systems (or locations of those systems) used to provide the computing resources. This cloud model may include at least five characteristics, at least three service models, and at least four deployment models.

Characteristics are as follows:

On-demand self-service: A cloud consumer can unilaterally provision computing capabilities, such as server time and network storage, as needed automatically without requiring human interaction with the provider of the service.

Broad network access: Capabilities are available over a network and accessed through standard mechanisms that promote use by heterogeneous thin or thick client platforms (e.g., mobile phones, laptops, and personal digital assistants (PDAs)).

Resource pooling: The computing resources of the provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): The capability provided to the consumer is to use the applications of the provider running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 illustrates a cloud computing environment 50, according to one or more embodiments. As shown, cloud computing environment 50 may include one or more cloud computing nodes 10 with which local computing devices used by cloud consumers, e.g., personal digital assistant or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described hereinabove, or a combination thereof. Accordingly, cloud computing environment 50 may offer infrastructure, platforms, and/or software as services for which a cloud consumer need not maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
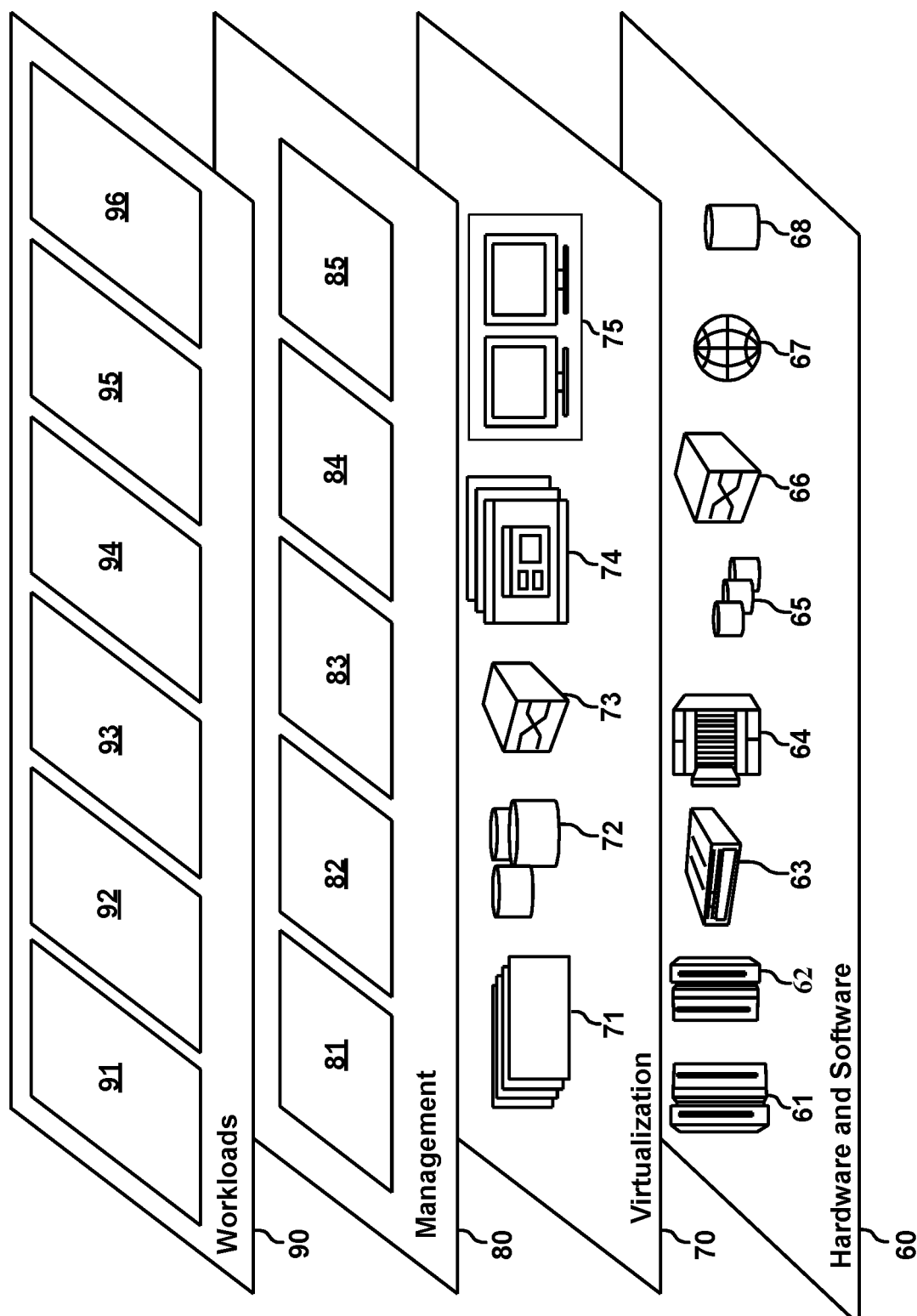
FIG. 2 depicts abstraction model layers provided by a cloud computing environment, according to one or more embodiments.

FIG. 2 illustrates a set of functional abstraction layers provided by cloud computing environment 50, according to one or more embodiments. It should be understood in advance that the components, layers, and functions shown in FIG. 2 are intended to be illustrative only; the various embodiments described herein are not limited thereto. As depicted, various layers and corresponding functions are provided. Specifically, hardware and software layer 60 includes hardware and software components. Examples of hardware components may include mainframes 61, RISC (Reduced Instruction Set Computer) architecture based servers 62, servers 63, blade servers 64, storage devices 65, and networks and networking components 66. In some embodiments, software components may include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that are utilized to perform tasks within cloud computing environment 50. Metering and pricing 82 may provide cost tracking as resources are utilized within cloud computing environment 50, and billing or invoicing for consumption of these resources. In one example, these resources may include application software licenses. Security provides identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with a SLA.

Workloads layer 90 provides examples of functionality for which cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and client profile configuration 96. Client profile configuration 96 enables management of a client immutable identification profile in accordance with the various embodiments described herein.

Figure 3:
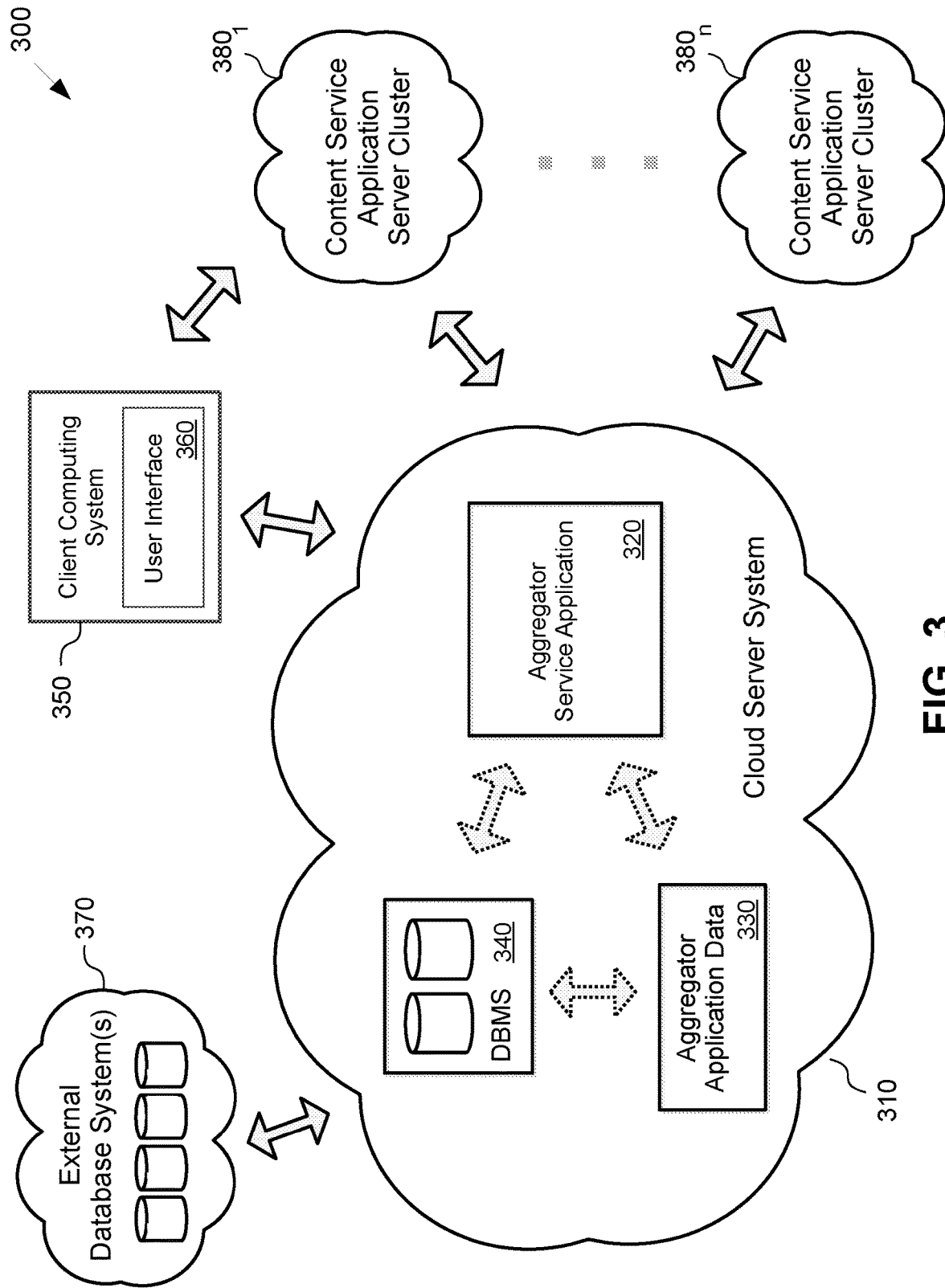
FIG. 3 depicts a managed services domain in a cloud computing environment, according to one or more embodiments.

FIG. 3 illustrates a managed services domain 300 within cloud computing environment 50. Some or all functionality related to client profile configuration 96 and other workloads/functionality is carried out in managed services domain 300. Managed services domain 300 includes cloud server system 310. As shown, cloud server system 310 includes an aggregator service application 320, aggregator server application data 330, and a database management system (DBMS) 340. Aggregator service application 320 is representative of a single application or multiple applications. Managed services domain 300 further includes a client computing system 350 including a user interface 360. Client computing system 350 is representative of a single client computing system or multiple client computing systems. User interface 360 is representative of a single user interface or multiple user interfaces. Managed services domain 300 further includes one or more external database systems 370 and a plurality of content service application server clusters $380_1$ to $380_n$. In an embodiment, cloud server system 310 is configured to communicate with the one or more external database systems 370 and the plurality of content service application server clusters $380_1$ to $380_n$. Additionally, respective servers within content service application server clusters $380_1$ to $380_n$ optionally are configured to communicate with one another and/or with server clusters in other domains.

In an embodiment, DBMS 340 includes one or more database servers, which may coordinate and/or manage various aspects of at least one repository, optionally including at least one knowledge base. In an additional embodiment, DBMS 340 manages or otherwise interacts with the one or more external database systems 370. The one or more external database systems 370 include one or more relational databases and/or one or more database management systems configured to interface with DBMS 340. In a further embodiment, DBMS 340 is a relational database management system (RDBMS). In a further embodiment, DBMS 340 stores relationships between the plurality of content service application server clusters $380_1$ to $380_n$ and aggregator service application 320. In a further embodiment, DBMS 340 stores relationships between the plurality of content service application server clusters $380_1$ to $380_n$ and client computing system 350. In a further embodiment, DBMS 340 manages association(s) and/or relationship(s) between aggregator service application 320 and client computing system 350. In a further embodiment, DBMS 340 includes or is operatively coupled to one or multiple databases, some or all of which may be relational databases. In a further embodiment, DBMS 340 includes one or more ontology trees or other ontological structures. Content service application server clusters $380_1$ to $380_n$ host and/or store aspects of various content service applications and also provide managed server services to one or more client systems, optionally including client computing system 350, and/or data systems.

Figure 4:
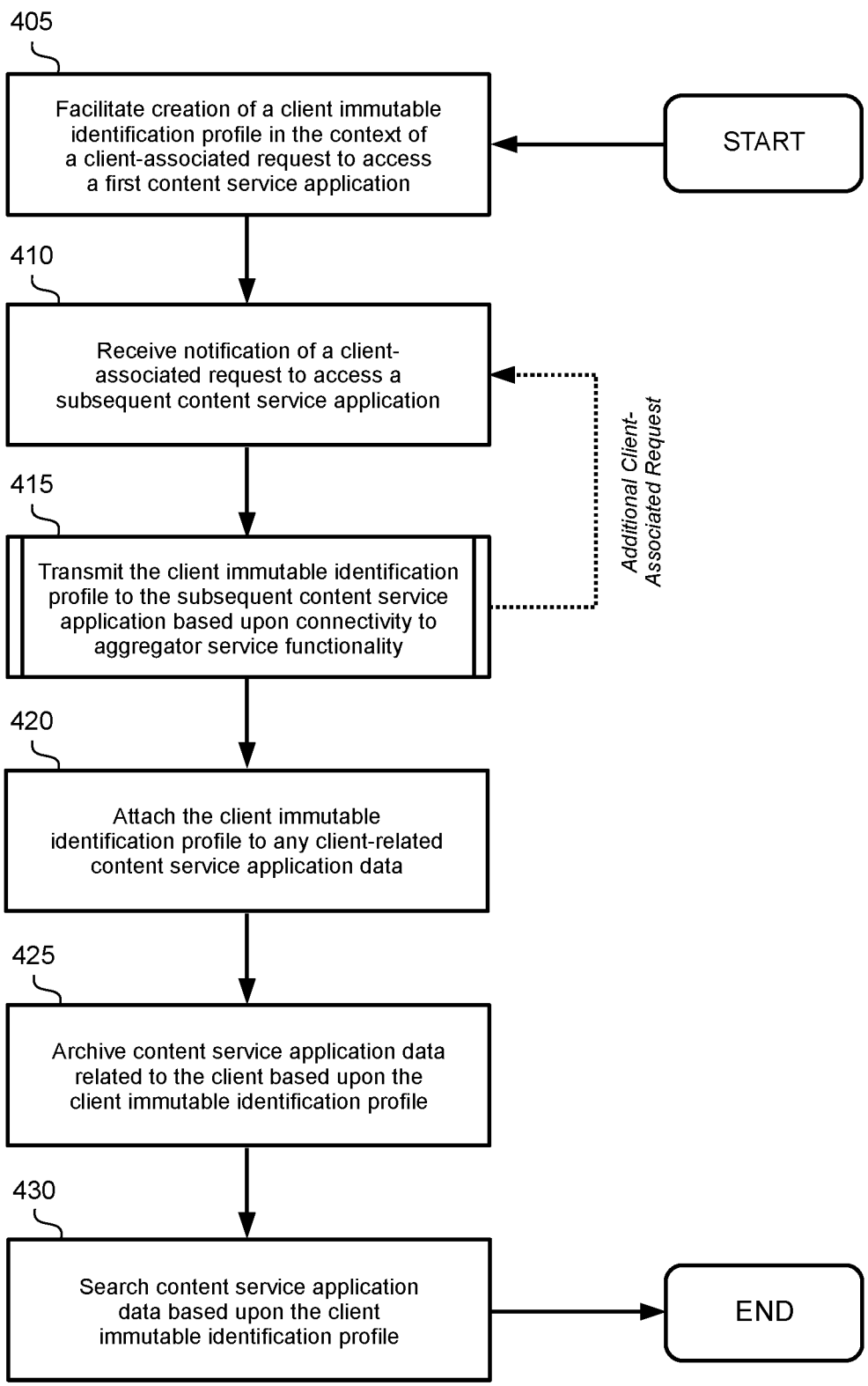
FIG. 4 illustrates a method of configuring a client immutable identification profile in a managed services domain, according to one or more embodiments.

FIG. 4 illustrates a method 400 of configuring a client immutable identification profile. In an embodiment, one or more steps associated with the method 400 are carried out in an environment in which computing capabilities are provided as a service (e.g., cloud computing environment 50). According to such embodiment, one or more steps associated with the method 400 are carried out in a managed services domain within the environment (e.g., managed services domain 300). The environment optionally is a hybrid cloud environment. In a further embodiment, one or more steps associated with the method 400 are carried out partially or wholly in one or more other environments, such as a client-server network environment or a peer-to-peer network environment. A centralized cloud server system in a managed services domain (e.g., cloud server system 310 in managed services domain 300) may facilitate processing according to the method 400 and the other methods further described herein. More specifically, an aggregator service application within or operatively coupled to the cloud server system (e.g., aggregator service application 320) executes or otherwise facilitates one or more steps of the method 400 and the other methods described herein. The client immutable identification profile configuration techniques facilitated or otherwise carried out via the cloud server system in the managed services domain may be associated with client profile configuration within a workloads layer among functional abstraction layers provided by the environment (e.g., client profile configuration 96 within workloads layer 90 of cloud computing infrastructure 50).

The method 400 begins at step 405, where the aggregator service application facilitates creation of an immutable identification profile associated with a client, i.e., a client immutable identification profile, in the context of a client-associated request to access a first content service application. The client immutable identification profile includes an immutable identification value associated with the client, i.e., a client immutable identification value, and an immutable identification credential set associated with the client, i.e., a client immutable identification credential set. The client-associated request to access the first content service application originates from a client computing system (e.g., client computing system 350). In the context of the various embodiments described herein, the client immutable identification profile is unmodifiable subsequent to creation and always is uniquely associated with the client. The client immutable identification profile remains associated with the client regardless of information changes related to the client. The aggregator service application is incapable of associating the client immutable identification profile with any other client subsequent to creation. In the context of the various embodiments, a client is an individual, a group of individuals, or an entity such as a company or a governmental/charitable organization. In the context of the various embodiments, a content service application is an application providing client access to content, e.g., with respect to data stored in a repository, and/or client access to at least one provided service. In an embodiment, the first content service application interfaces with or otherwise is associated with at least one repository. A database management system associated with the managed services domain (e.g., DBMS 340) optionally facilitates communication between the at least one repository and content service applications described in the context of the method 400 and other methods herein, including the first content service application. The at least one repository optionally is located in or otherwise is associated with one or more database systems external to the cloud server system (e.g., one or more external database systems 370). Additionally or alternatively, the first content service application provides one or more computing services. The one or more computing services optionally include content creation services, e.g., associated with social networking, or data processing services, e.g., associated with document publishing or audiovisual content creation/enhancement. The one or more computing services optionally include services associated with storage, data management, etc. Some or all aspects of the first content service application and other content service applications described in the context of the method 400 and other methods herein optionally are among a plurality of content service application server clusters (e.g., the plurality of content service application server clusters $380_1$ to $380_n$).

In an embodiment, the client immutable identification credential set includes one or more data fields associated with the client. The one or more client data fields optionally are associated with client security credentials and/or client data access credentials. In a related embodiment, one or more data fields associated with client security credentials include one or more of the following: at least one client identification string, e.g., client name and/or client email, client login locations, a listing of client-affiliated devices, at least one client physical mailing address, respective client relationship mappings to other clients associated with aggregator service application processing, and respective client relationship mappings to other clients associated with content service application processing. In a further related embodiment, one or more data fields associated with client data access credentials include one or more of the following: client content service application access history, client history of data transfer between or among content service applications, client history of data transfer to or communication with other clients associated with aggregator service application processing, and client history of data transfer to or communication with other clients associated with content service application processing. In an alternative embodiment, aspects of the client immutable identification credential set are divided into two separate profile entities: a client immutable identification security credential set and a client immutable identification data access credential set.

In an embodiment, the aggregator service application facilitates creation of the client immutable identification value by facilitating mapping of respective data fields of the client immutable identification credential set. In a related embodiment, the aggregator service application facilitates mapping of a respective data field or a respective set of data fields of the client immutable identification credential set to a respective portion of the client immutable identification value, e.g., such that the client immutable identification value is comprised of portions respectively corresponding to data fields or sets of data fields. According to such related embodiment, the client immutable identification value optionally comprises a composite portion-based mapping from the client immutable identification credential set. Such composite portion-based mapping to the client immutable identification value results in the value comprising a composite of mapped portions from the client immutable identification credential set. Optionally, the composite of mapped portions from the client immutable identification credential set are concatenated or otherwise combined. In a further embodiment, the aggregator service application facilitates hash mapping of respective data fields of the client immutable identification credential set in order to determine the client immutable identification value. Such hash mapping optionally creates a single value for the client immutable identification value by mapping data field aspects into the single value. In a further embodiment, in the context of client authentication as further described herein, the aggregator service application applies at least one hashing function to confirm identity of the client via comparison of a hashed client input value obtained via the at least one hashing function to the client immutable identification value. In a further embodiment, the client immutable identification credential set is stored partially or wholly as an array, as a linked list, and/or in another type of data structure permitting storage of a set of credential data fields. Optionally, respective data fields within any such data structure are mapped, e.g., hash mapped, to a singular value representing the client immutable identification value. Optionally, the client immutable identification value is stored in a same data structure as some or all data fields of the client immutable identification credential set. In a further embodiment, some or all aspects of the client immutable identification profile are stored among data associated with the aggregator service application (e.g., among aggregator application data 330).

In an embodiment, the aggregator service application creates the client immutable identification profile only in response to receiving notification of the client-associated request to access the first content service application. In an alternative embodiment, the aggregator service application creates the client immutable identification profile in advance of the client requesting content service application access, in anticipation of the client accessing the first content service application or another content service application. In a further alternative embodiment, the first content service application creates the client immutable identification profile in response to the client-associated access request and registers the newly-created client immutable identification profile with the aggregator service application. In an additional embodiment, the aggregator service application facilitates creation of the client immutable identification profile only upon confirming identity of the client, e.g., by applying a plurality of authentication factors as further described herein.

Upon facilitating creation of the client immutable identification profile, the aggregator service application associates the client immutable identification profile with the first content service application. In an embodiment, the aggregator service application prevents creation of any unconfirmed client account associated with the first content service application by refusing any client-associated credentials inconsistent with corresponding credentials of the client immutable identification credential set. Accordingly, based upon aggregator service functionality provided to the first content service application upon creation of the client immutable identification profile, the aggregator service application acts or is capable of acting preemptively to prevent creation of any unconfirmed client account in association with the first content service application. In the context of the various embodiments described herein, an unconfirmed client account is an account created on behalf of a client having an initially unknown origin.

At step 410, the aggregator service application receives notification of a client-associated request to access a subsequent content service application. The client-associated request originates from the client computing system and is purportedly from the client, subject to authentication as further described herein. In an embodiment, the subsequent content service application interfaces with or otherwise is associated with a repository. Additionally or alternatively, the subsequent content service application provides one or more computing services. In an additional embodiment, the aggregator service application automatically receives notification of the client-associated request to access the subsequent content service in a scenario in which the subsequent content service application is connected to aggregator service functionality. In a further embodiment, the aggregator service application receives notification of the client-associated request to access the subsequent content service application in response to a crawler or another type of bot configured to systematically browse and/or automatically browse an internet environment or a cloud computing environment associated with content service application activity. In a further embodiment, the aggregator service application receives notification of the client-associated request to access the subsequent content service application based upon interaction with content service application data associated with the client. According to such further embodiment, the aggregator service application optionally detects application crosstalk associated with the subsequent content service application based upon client activity related to another content service application. For instance, the aggregator service application may detect client data associated with the subsequent content service application based upon client activity related to the first content service application, such as a client data transfer between the subsequent content service application and the first content service application.

At step 415, the aggregator service application transmits the client immutable identification profile to the subsequent content service application based upon connectivity to aggregator service functionality. According to step 415, the aggregator service application executes respective tasks to complete transmission of the client immutable identification profile dependent upon whether the subsequent content service application is connected to aggregator service functionality. As further described herein, the aggregator service application facilitates connection to aggregator service functionality responsive to determining that the subsequent content service application is not connected to aggregator service functionality. A method with regard to transmitting the client immutable identification profile to the subsequent content service application based upon connectivity to aggregator service functionality according to step 415 is described with respect to FIG. 5.

In one or more further embodiments, the aggregator service application optionally repeats steps 410 and 415 in the context of receiving notification of at least one additional client-associated request to access at least one further content service application, in which case the aggregator service application transmits the client immutable identification profile to each of the at least one further content service application based upon connectivity to aggregator service functionality. The aggregator service application optionally handles the at least one additional client-associated request to access the at least one further content service application in a manner analogous to handling of the subsequent content service application as discussed in the context of steps 410 and 415. One or more of the at least one further content service application interface with or otherwise are associated with a repository. Additionally or alternatively, one or more of the at least one further content service application provide one or more computing services.

At step 420, the aggregator service application attaches the client immutable identification profile to any content service application data related to the client. The aggregator service application attaches the client immutable identification profile to any client-related data attribute associated with the first content service application, the subsequent content service application, and/or any further content service application. In an embodiment, the aggregator service application by default attaches the client immutable identification profile to any new application data attribute related to the client. In an additional embodiment, the aggregator service application attaches the client immutable identification profile to any existing application data attribute related to the client that is yet to be attached to any immutable identification profile. In a further embodiment, the aggregator service application attaches the client immutable identification profile to any application data attribute referencing activity related to the client, e.g., a client access attempt with respect to the application. In a further embodiment, for content service application data associated with multiple clients, e.g., application data accessed, modified, or otherwise processed by multiple clients, the aggregator service application classifies, e.g., marks or otherwise identifies, any application data portion associated with the client by attaching the client immutable identification profile to any such portion and/or metadata associated therewith. Accordingly, the aggregator service application enables granular identification of application data portions associated with the client. In a further embodiment, the aggregator service application by default facilitates adding or otherwise associating the client immutable identification value and/or the client immutable identification credential set to metadata of each new or existing application data attribute or application data portion created, viewed, modified, or otherwise processed by the client. In a further embodiment, metadata of any application data attribute or application data portion created, viewed, modified, or otherwise processed by the client as stored in association with the first content service application, in association with the subsequent content service application, or in association with any further content service application retains at least one aspect related to the client immutable identification profile, regardless of any subsequent use or modification of any such application data attribute or application data portion. According to such further embodiment, such metadata optionally retains at least one record referencing the client immutable identification profile, e.g., in data access history data field(s).

At step 425, the aggregator service application archives content service application data related to the client based upon the client immutable identification profile. Based upon the client immutable identification profile, the aggregator service application archives client-related data attributes associated with the first content service application, the subsequent content service application, and/or any further content service application. The aggregator service application optionally archives respective application data attributes based upon time of access, application name, application type, etc. In an embodiment, the aggregator service application facilitates indexing of archived content service application data by the respective application data attributes. The database management system associated with the managed services domain optionally completes such indexing and further enables access to content service application data based upon such indexing, as discussed in the subsequent step. The aggregator service application creates and/or stores an association between the respective data attributes by which content service application data is indexed and the client immutable identification profile. In an additional embodiment, the archived content service application data includes access data related to the client immutable identification profile. The access data optionally includes time-based records of the client interfacing with respective applications connected to aggregator service functionality, including the first content service application and the subsequent content service application. In a further embodiment, the archived content service application data includes application data related to the client immutable identification credential set. By archiving client-related content service application data based upon the client immutable identification profile according to step 425, the aggregator service application maintains a provenance and lineage record associated with client access and management of content service application data. Such provenance and lineage record enables the aggregator service application to track how and when the client accesses and manages content service application data, e.g., thus enabling tracking of application data creation, modification, and/or deletion. Optionally, the aggregator service application configures the provenance and lineage record to track content service application data sharing with other entities, e.g., other client(s) associated with the aggregator service application. Additionally or alternatively, the aggregator service application configures the provenance and lineage record to track database modifications or other repository modifications made by the client and/or by entities associated with the client. By archiving client-related content service application data based upon the client immutable identification profile, the aggregator service application facilitates aggregation of application data related to the client across multiple content service applications and/or across multiple client devices.

At step 430, responsive to a client-initiated search query, the aggregator service application searches content service application data based upon the client immutable identification profile. In an embodiment, the aggregator service application focuses the search upon content service application data archived according to step 425. Based upon the client immutable identification profile, the aggregator service application searches client-related data archived or otherwise stored in association with the first content service application, the subsequent content service application, and/or any further content service application. In an embodiment, the aggregator service application provides a search interface to the client, e.g., via a graphical user interface and/or a command line interface within or operatively coupled to a user interface associated with the client computing system (e.g., user interface 360 of client computing system 350). The user interface optionally communicates with the aggregator service application and/or communicates with an application providing access to aggregator service application data. According to such embodiment, responsive to the client submitting a search query, e.g., via a command line submitted via a command line interface or via a graphical user interface element entry in a text box or a selection made within a user-selectable interface element via a graphical user interface, the aggregator service application searches for client-related data based upon the search query, optionally via the database management system associated with the managed services domain, and returns to the client results retrieved in response to the search query. In an additional embodiment, the database management system enables access to content service application data indexed by the application data attributes associated with the client immutable identification profile, including content service application data archived according to step 425. According to such additional embodiment, the database management system is capable of accessing content service application data referenced in the search query based upon such indexing. By searching content service application data based upon the client immutable identification profile, the aggregator service application is capable of searching any application data to which the client immutable identification profile is attached. Accordingly, based upon the search, the aggregator service application is capable of returning all client-related application data associated with the search query from all content service applications connected to aggregator service functionality, regardless of account name differences or client identification distinctions among such applications. Thus, consequent to searching according to step 430, the client is capable of discovering data on any application platform, from any historical context, even with respect to application platforms forgotten or no longer used, and even with respect to application components unknown to other entities. In a further embodiment, the aggregator service application returns results of the client-initiated search query to a dashboard associated with the user interface. Optionally, the user interface dashboard includes one or more functional aspects independent from any particular content service application. Additionally or alternatively, the user interface dashboard incorporates one or more aspects of a content service application API. In a further embodiment, the aggregator service application returns results of the client-initiated search query via a representational state transfer application programming interface (REST API). The REST API optionally is incorporated into or otherwise is associated with the user interface.

The aggregator service application optionally executes one or more of steps 420-430 in any order. The aggregator service application optionally executes one or more of steps 420-430 with respect to the first content service application at any time upon associating the client immutable identification profile with the first content service application. The aggregator service application optionally executes one or more of steps 420-430 with respect to the subsequent content service application at any time upon associating the client immutable identification profile with the subsequent content service application. The aggregator service application optionally executes one or more of steps 420-430 with respect to any further content service application at any time upon associating the client immutable identification profile with any such further content service application.

Figure 5:
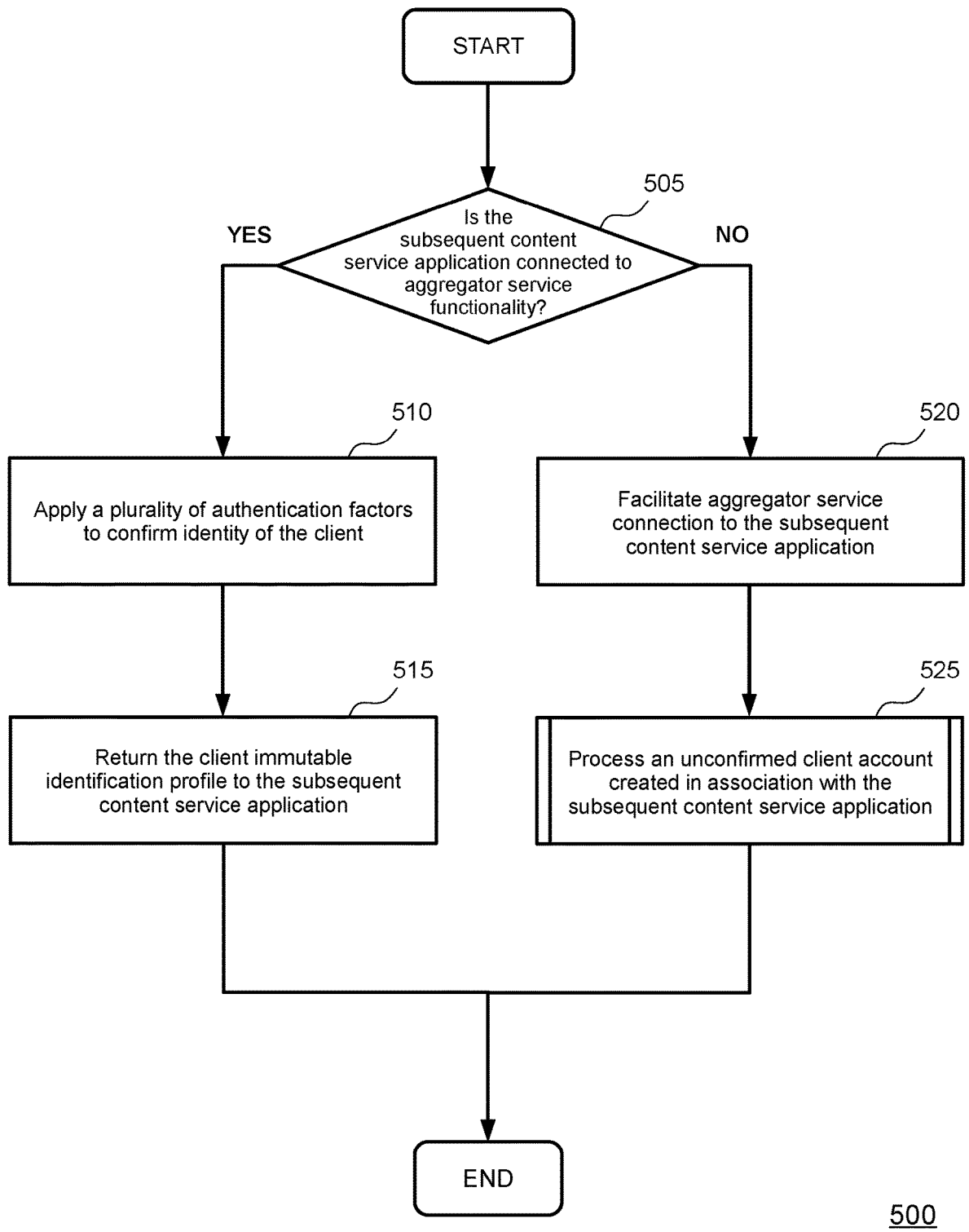
FIG. 5 illustrates a method of transmitting a client immutable identification profile to a subsequent content service application based upon connectivity to aggregator service functionality, according to one or more embodiments.

FIG. 5 illustrates a method 500 of transmitting the client immutable identification profile to the subsequent content service application based upon connectivity to aggregator service functionality. The method 500 provides one or more embodiments with respect to step 415 of the method 400. The method 500 begins at step 505, where the aggregator service application determines whether the subsequent content service application is connected to aggregator service functionality. Responsive to determining that the subsequent content service application is connected to aggregator service functionality, at step 510 the aggregator service application applies a plurality of authentication factors to confirm identity of the client. In an embodiment, the aggregator service application verifies the plurality of authentication factors based upon the client immutable identification profile. According to such embodiment, the aggregator service application verifies the plurality of authentication factors by comparing one or more client authentication input aspects with one or more corresponding aspects included within the client immutable identification profile. Optionally, the aggregator service application receives one or more client authentication input aspects associated with one or more of the plurality of authentication factors via the user interface associated with the client computing system. The aggregator service application optionally verifies the plurality of authentication factors by comparing one or more client authentication input data aspects with one or more corresponding data fields of the client immutable identification credential set.

In an embodiment, the aggregator service application applies three-factor authentication according to step 510 at least in part by inspecting media access control address (MAC address) of a device from which the client-associated request is received, e.g., the MAC address of the client computing system. In a further embodiment, the aggregator service application applies a plurality of authentication factors at least in part by requesting at least one response to at least one client-specific challenge question. The at least one client-specific challenge question optionally pertains to at least one personal attribute uniquely associated with the client. According to such further embodiment, the aggregator service application optionally presents a maiden name authentication challenge. Additionally or alternatively, according to such further embodiment, the aggregator service application optionally presents a social security number or other personal/entity identification number challenge. In a further embodiment, the aggregator service application applies three-factor authentication at least in part by requesting a password, a personal identification number (PIN), and/or a key. In a further embodiment, in the event that the client immutable identification value is created via at least one hashing function, the aggregator service application applies a plurality of authentication factors at least in part by applying the at least one hashing function to confirm identity of the client. According to such further embodiment, the aggregator service application compares a hashed client input value obtained via the at least one hashing function to the client immutable identification value. In one or more further embodiments, the aggregator service application applies three-factor authentication at least in part by applying one or more authentication factors including biometric identification, device challenge, and/or encryption key generation.

Upon confirming identity of the client according to step 510, at step 515 the aggregator service application returns, e.g., transmits, the client immutable identification profile to the subsequent content service application. Upon returning the client immutable identification profile, the aggregator service application associates the client immutable identification profile with the subsequent content service application. In an embodiment, the aggregator service application returns to the subsequent content service application the client immutable identification profile upon authentication of the client, regardless of any device or account via which the client accesses the subsequent content service application. In a related embodiment, the subsequent content service application seeks retrieval of the client immutable authentication profile upon client access of the subsequent content service application via any device or account. In an alternative related embodiment, the aggregator service application automatically returns, or pushes, the client immutable authentication profile to the subsequent content service application upon client access of the subsequent content service application via any device or account. In an additional embodiment, upon returning the client immutable identification profile to the subsequent content service application, the aggregator service application by default facilitates adding or otherwise associating the client immutable identification value and/or the client immutable identification credential set to metadata of each application data attribute created, viewed, modified, or otherwise processed by the client. Optionally, the aggregator service application archives each application data attribute based upon time of access, application name, application type, etc. In a further embodiment, the metadata of any application data attribute created, viewed, modified, or otherwise processed by the client as stored by the subsequent content service application, e.g., as stored in a repository associated with the subsequent content service application, retains the client immutable identification value and/or the client immutable identification credential set.

In an embodiment, returning the client immutable identification profile according to step 515 includes returning the client immutable identification value. In an additional embodiment, returning the client immutable identification profile includes returning the client immutable identification credential set. According to steps 510 and 515, the aggregator service application returns the client immutable identification profile as the client accesses the subsequent content service application and is authenticated, thus enabling the subsequent content service application to identify and evaluate the client in view of the profile. In a further embodiment, the aggregator service application, already connected to the subsequent content service application via aggregator service functionality, prevents creation of any unconfirmed client account associated with the subsequent content service application. In a related embodiment, the aggregator service application prevents creation of any unconfirmed client account associated with the subsequent content service application by refusing any client-associated credentials inconsistent with corresponding credentials of the client immutable identification credential set. Accordingly, based upon aggregator service functionality, the aggregator service application acts or is capable of acting preemptively to prevent creation of any unconfirmed client account in association with the subsequent content service application.

Responsive to determining that the subsequent content service application is not connected to aggregator service functionality, at step 520 the aggregator service application facilitates aggregator service connection to the subsequent content service application. In an embodiment, the aggregator service application facilitates aggregator service connection to the subsequent aggregator service application by establishing a communication channel between the aggregator service application and the subsequent content service application. The communication channel optionally is established and serviced via a standardized aggregator service API that interfaces with the subsequent content service application. In an additional embodiment, the aggregator service application facilitates aggregator service connection to the subsequent aggregator service application based upon at least one aggregator service connection setting associated with the subsequent content service application. According to such additional embodiment, the at least one aggregator service connection setting optionally includes a capability to apply a crawler or another type of bot configured to systematically browse and/or automatically browse for aggregator service functionality in an internet environment or a cloud computing environment associated with content service application activity. In a further embodiment, the aggregator service application facilitates aggregator service connection to the subsequent aggregator service application based upon interaction of the client with content associated with the subsequent content service application. According to such further embodiment, the aggregator service application optionally facilitates aggregator service connection to the subsequent aggregator service application responsive to detection of application crosstalk associated with the subsequent content service application based upon client activity related to another content service application, e.g., a client data transfer between the subsequent content service application and the other content service application. In a further embodiment, the aggregator service application facilitates aggregator service connection to the subsequent aggregator service application based upon at least one preference designated by the client with respect to aggregator service application connectivity. The aggregator service application optionally facilitates aggregator service connection based upon multiple such embodiments.

At step 525, the aggregator service application processes an unconfirmed client account created in association with the subsequent content service application. In the context of step 525, the unconfirmed client account is created purportedly by the client for access to the subsequent content service application. Creation of an unconfirmed client account with respect to the subsequent content service application may occur due to lack of connection to aggregator service functionality. Subsequent to facilitating aggregator service connection to the subsequent content service application according to step 520, as further described herein the aggregator service application is capable of identifying an unconfirmed client account and reconciling the unconfirmed client account in view of the client immutable identification profile. A method with regard to processing the unconfirmed client account according to step 525 is described with respect to FIG. 6. Optionally, the aggregator service application processes multiple unconfirmed client accounts created in association with the subsequent content service application according to step 525.

In sum, transmitting the client immutable identification profile to the subsequent content service application according to the method 500 includes, responsive to determining that the subsequent content service application is connected to aggregator service functionality, applying a plurality of authentication factors to confirm identity of the client, and returning the immutable identification profile associated with the client to the subsequent content service application. Transmitting the client immutable identification profile to the subsequent content service application according to the method 500 further includes, responsive to determining that the subsequent content service application is not connected to aggregator service functionality, facilitating aggregator service connection to the subsequent content service application, and processing an unconfirmed client account created in association with the subsequent content service application.

Figure 6:
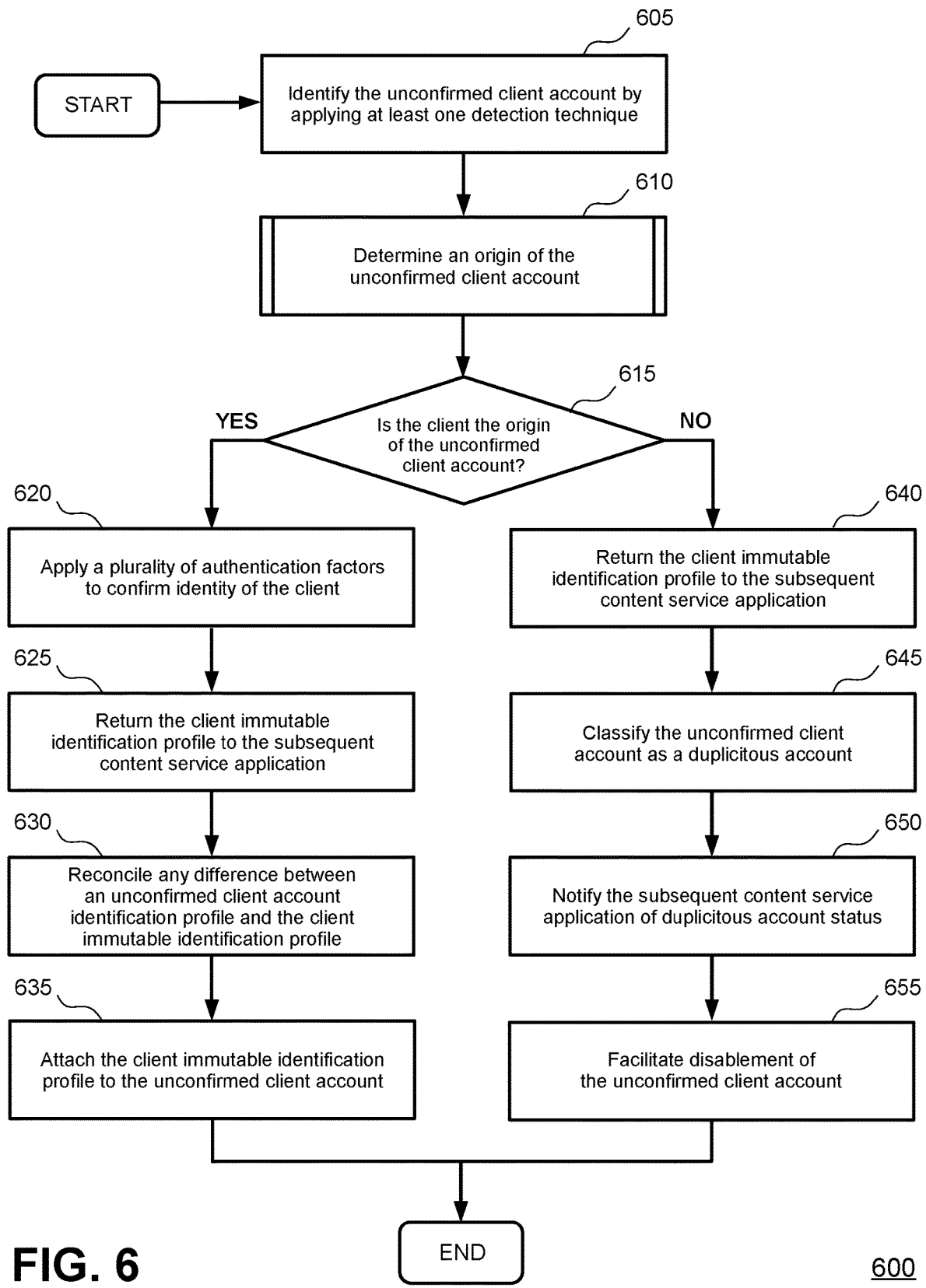
FIG. 6 illustrates a method of processing an unconfirmed client account created in association with a subsequent content service application, according to one or more embodiments.

FIG. 6 illustrates a method 600 of processing the unconfirmed client account created in association with the subsequent content service application. The method 600 provides one or more embodiments with respect to step 525 of the method 500. The method 600 begins at step 605, where the aggregator service application identifies the unconfirmed client account by applying at least one detection technique. In an embodiment, the at least one detection technique includes at least one verification point for unique client identification. The at least one detection technique optionally includes detecting login to multiple distinct accounts associated with the subsequent content service application from a single device. The at least one detection technique optionally includes detecting failure to use the client immutable identification credential set or credentials consistent therewith to access one or more content service applications from a single device. The at least one detection technique optionally includes detecting failure to use the client immutable identification credential set to access other content service applications from the single device. The at least one detection technique optionally includes a number of unsuccessful login attempts to the subsequent content service application exceeding a predetermined login attempt threshold. The predetermined login attempt threshold is determined optionally by the client or alternatively by the aggregator service application. In an additional embodiment, upon identifying the unconfirmed client account, the aggregator service application logs information related to the unconfirmed client account. In a related embodiment, the aggregator service application logs the related information by recording any content service application or associated repository associated with the unconfirmed client account, time of account creation, device information associated with account creation, etc. At step 610, the aggregator service application determines an origin of the unconfirmed client account. A method with regard to determining the origin of the unconfirmed client account according to step 610 is described with respect to FIG. 7.

At step 615, the aggregator service application determines whether the origin of the unconfirmed client account is the client. Responsive to determining the origin of the unconfirmed client account to be the client, at step 620 the aggregator service application applies a plurality of authentication factors to confirm identity of the client. In an embodiment, the plurality of authentication factors are verifiable by the aggregator service application based upon the client immutable identification profile, as previously discussed with respect to step 510. One or more embodiments previously discussed with respect to applying the plurality of authentication factors to confirm identity of the client according to step 510 optionally are applicable in the context of step 620. At step 625, responsive to determining the origin of the unconfirmed client account to be the client and upon confirming identity of the client according to step 620, the aggregator service application returns, e.g., transmits, the client immutable identification profile to the subsequent content service application. Upon returning the client immutable identification profile, the aggregator service application associates the client immutable identification profile with the subsequent content service application. One or more embodiments previously discussed with respect to returning the client immutable identification profile according to step 515 optionally are applicable in the context of step 625.

At step 630, the aggregator service application reconciles any difference between an identification profile associated with the unconfirmed client account and the client immutable identification profile. At step 635, the aggregator service application attaches the client immutable identification profile to the unconfirmed client account by facilitating replacement of the identification profile associated with the unconfirmed client account with the client immutable identification profile. In an embodiment, the aggregator service application replaces the unconfirmed client account identification profile with the client immutable identification profile by adapting the unconfirmed client account based upon any reconciled difference between the unconfirmed client account identification profile and the client immutable identification profile. In an additional embodiment, the aggregator service application merges authorship of the client with respect to the unconfirmed client account into the client immutable identification profile. Such merger ensures consistent identification of authorship among all content service applications connected with the aggregator service application. In a further embodiment, replacing the unconfirmed client account identification profile with the client immutable identification profile includes replacement of any identification value associated with the unconfirmed client account with the client immutable identification value. In a further embodiment, replacing the unconfirmed client account identification profile with the client immutable identification profile includes replacement of any identification credential set associated with the unconfirmed client account with the client immutable identification credential set. Responsive to determining the origin of the unconfirmed client account to be the client, according to steps 620-635 the aggregator service application reconciles the unconfirmed client account with the client immutable identification profile.

Responsive to determining the origin of the unconfirmed client account not to be the client, i.e., a third party other than the client, at step 640 the aggregator service application returns the client immutable identification profile to the subsequent content service application. By returning the client immutable identification profile to the subsequent content service application, the aggregator service application may aid the subsequent content service application in preempting any future unconfirmed account associated with the client, as the subsequent content service application may compare any future created account associated with the client with the client immutable identification profile. At step 645, the aggregator service application classifies the unconfirmed client account as a duplicitous account. At step 650, the aggregator service application notifies the subsequent content service application of duplicitous account status. In an embodiment, the aggregator service application warns the subsequent content service application of potential activity unauthorized by the client. In an alternative embodiment, the aggregator service application executes step 650 prior to or concurrently with one or more of steps 640-645 or 655. At step 655, the aggregator service application facilitates disablement of the unconfirmed client account. In an embodiment, the aggregator service application facilitates disablement of the unconfirmed client account by facilitating return to the client of any client-related credentials affected by the unconfirmed client account. According to such embodiment, the aggregator service application disables use of any such relevant client credentials by the third party or any other non-client entity. According to such embodiment, the aggregator service application ensures that any such relevant client credentials belong exclusively to the client with respect to content service application use. According to such embodiment, the aggregator service application facilitates reclaiming of any client credentials affected by the unconfirmed client account, for exclusive client use in association with the client immutable identification profile if applicable. In an alternative embodiment, the aggregator service application executes step 655 prior to or concurrently with one or more of steps 640-650.

In an embodiment, settings with regard to disposition of the duplicitous unconfirmed client account are provided at least in part by the client. In a further embodiment, settings with regard to disposition of the duplicitous unconfirmed client account are provided via at least one predetermined setting associated with the aggregator service application. In a further embodiment, the aggregator service application provides to any other content service application connected to aggregator service functionality details regarding the duplicitous unconfirmed client account, including any digital fingerprint associated with the unconfirmed client account. According to such further embodiment, any such other content service application optionally compares existing accounts with any digital fingerprint associated with the duplicitous unconfirmed client account to determine risk associated with the third party from which the duplicitous unconfirmed client account originated. By processing unconfirmed client accounts according to the method 600, the aggregator service application preserves integrity of the client immutable identification profile.

In sum, processing the unconfirmed client account created in association with the subsequent content service application according to the method 600 includes identifying the unconfirmed client account by applying at least one detection technique and determining an origin of the unconfirmed client account. Processing the unconfirmed client account created in association with the subsequent content service application according to the method 600 further includes, responsive to determining the origin of the unconfirmed client account to be the client, applying a plurality of authentication factors to confirm identity of the client, returning the immutable identification profile associated with the client to the subsequent content service application, reconciling any difference between an identification profile associated with the unconfirmed client account and the immutable identification profile associated with the client, and attaching the immutable identification profile associated with the client to the unconfirmed client account by facilitating replacement of the identification profile associated with the unconfirmed client account with the immutable identification profile associated with the client. Processing the unconfirmed client account created in association with the subsequent content service application according to the method 600 further includes, responsive to determining the origin of the unconfirmed client account to be a third party, returning the immutable identification profile associated with the client to the subsequent content service application, classifying the unconfirmed client account as a duplicitous account, notifying the subsequent content service application of duplicitous account status, and facilitating disablement of the unconfirmed client account.

Figure 7:
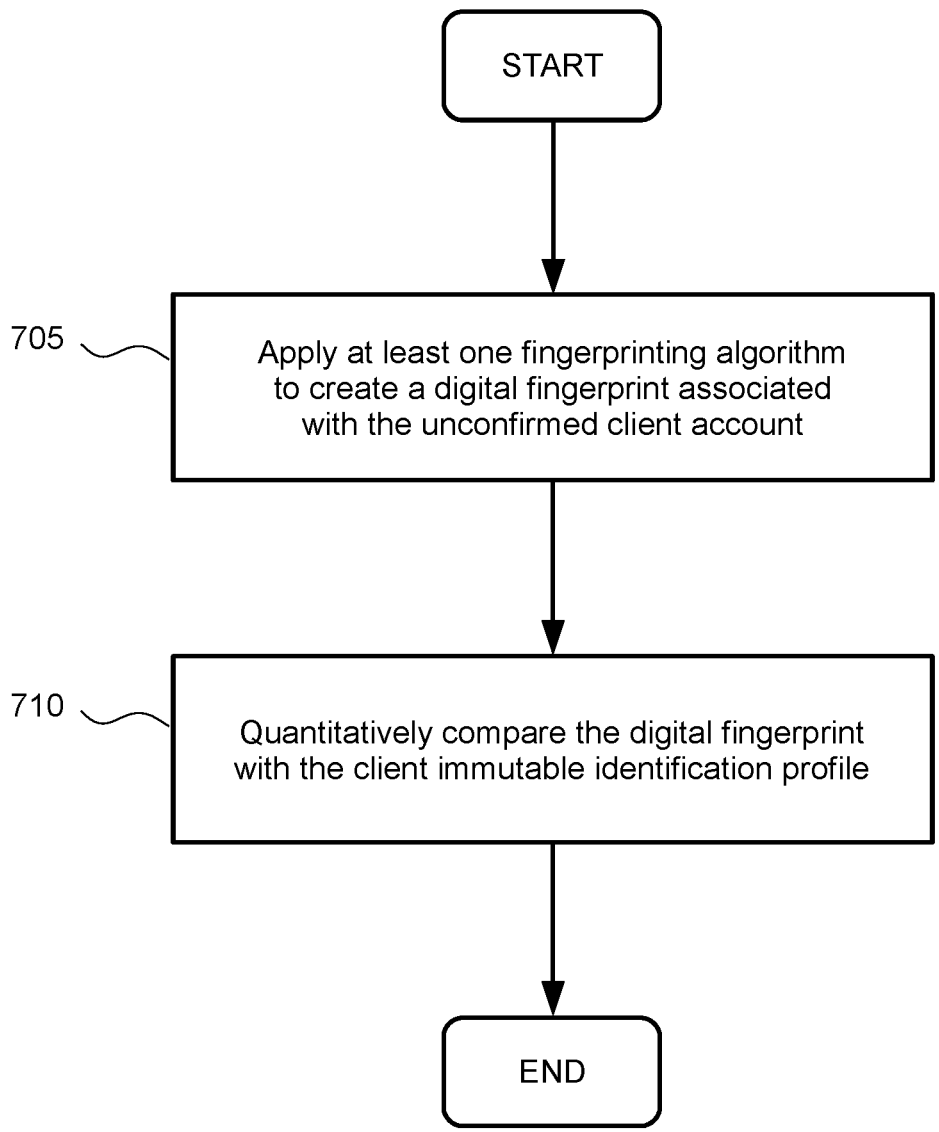
FIG. 7 illustrates a method of determining origin of an unconfirmed client account, according to one or more further embodiments.

FIG. 7 illustrates a method 700 of determining the origin of the unconfirmed client account. The method 700 provides one or more embodiments with respect to step 610 of the method 600. The method 700 begins at step 705, where the aggregator service application applies at least one fingerprinting algorithm based upon datapoints created from application of the at least one detection technique at step 605 in order to create a digital fingerprint associated with the unconfirmed client account. At step 710, the aggregator service application quantitatively compares the digital fingerprint with the client immutable identification profile. Based upon the comparison, the aggregator service application determines whether the unconfirmed client account results from an error made by the client or from an intentional attempted breach by a third party. In an embodiment, the aggregator service application determines the origin based upon whether level of similarity between the digital fingerprint associated with the unconfirmed client account and the client immutable identification profile exceeds a predetermined similarity threshold. The predetermined similarity threshold optionally is an integer value on a predefined integer scale, e.g., from 0 to 100, alternatively is a normalized value on a decimal scale, e.g., from 0.0 to 1.0, or alternatively is a percentage value on a predefined percentage scale, e.g., from 0% to 100%. The predetermined similarity threshold is determined optionally by the client or alternatively by the aggregator service application. In a related embodiment, responsive to determining that the level of similarity between the digital fingerprint and the client immutable identification profile exceeds a predetermined similarity threshold, the aggregator service application determines the origin of the unconfirmed client account to be the client. Conversely, responsive to determining that the level of similarity between the digital fingerprint and the client immutable identification profile does not exceed a predetermined similarity threshold, the aggregator service application determines the origin of the unconfirmed client account to be a third party, i.e., an entity other than the client. Such third party may act in error or alternatively may be a bad actor attempting to imitate the client for a fraudulent objective. In an additional embodiment, the aggregator service application compares the digital fingerprint with the client immutable identification profile by comparing respective data field aspects associated with the digital fingerprint with corresponding data field aspects of the client immutable identification credential set. For instance, the aggregator service application may compare a digital fingerprint data field aspect indicating a computing device from which the unconfirmed client account originated to one or more corresponding data field aspects of the client immutable identification credential set relating to computing device use. In another instance, the aggregator service application may compare a digital fingerprint data field aspect indicating a content service application access history related to the unconfirmed client account to one or more corresponding data field aspects of the client immutable identification credential set relating to content service application access history.

In sum, determining the origin of the unconfirmed client account according to the method 700 includes applying at least one fingerprinting algorithm based upon datapoints created from application of the at least one detection technique in order to create a digital fingerprint associated with the unconfirmed client account, and quantitatively comparing the digital fingerprint with the immutable identification profile associated with the client.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   facilitating creation of an immutable identification profile associated with a client in a context of a client-associated request to access a first content service application, the immutable identification profile comprising an immutable identification value and an immutable identification credential set;
   receiving notification of a client-associated request to access a subsequent content service application, wherein the subsequent content service application is not connected to aggregator service functionality;
   facilitating aggregator service connection to the subsequent content service application, wherein an unconfirmed client account is created in association with the subsequent content service application;
   processing the unconfirmed client account, wherein the unconfirmed client account is processed by identifying the unconfirmed client using one or more detection techniques and determining an origin of the unconfirmed client account; and
   transmitting the immutable identification profile associated with the client to the subsequent content service application based upon connectivity to the aggregator service functionality.

2. The computer-implemented method of claim 1, further comprising:
   attaching the immutable identification profile associated with the client to content service application data related to the client, wherein the content service application data related to the client includes at least content from the first content service application and the subsequent content service application;

archiving the content service application data related to the client based upon the immutable identification profile associated with the client, wherein the archiving of the content service application data includes merging authorship of the client with respect to the first content service application and the subsequent content service application; and responsive to a client-initiated search query, searching the content service application data based upon the immutable identification profile associated with the client.

3. The computer-implemented method of claim 1, wherein transmitting the immutable identification profile associated with the client to the subsequent content service application comprises:

responsive to determining that the subsequent content service application is connected to aggregator service functionality:

applying a plurality of authentication factors to confirm identity of the client; and returning the immutable identification profile associated with the client to the subsequent content service application.

4. The computer-implemented method of claim 1, wherein determining the origin of the unconfirmed client account comprises:

applying at least one fingerprinting algorithm based upon datapoints created from application of the one or more detection techniques in order to create a digital fingerprint associated with the unconfirmed client account; and quantitatively comparing the digital fingerprint with the immutable identification profile associated with the client.

5. The computer-implemented method of claim 1, wherein processing the unconfirmed client account further comprises:

responsive to determining the origin of the unconfirmed client account to be the client:

applying a plurality of authentication factors to confirm identity of the client; and returning the immutable identification profile associated with the client to the subsequent content service application.

6. The computer-implemented method of claim 5, wherein processing the unconfirmed client account further comprises:

responsive to determining the origin of the unconfirmed client account to be the client:

reconciling any difference between an identification profile associated with the unconfirmed client account and the immutable identification profile associated with the client; and attaching the immutable identification profile associated with the client to the unconfirmed client account by facilitating replacement of the identification profile associated with the unconfirmed client account with the immutable identification profile associated with the client.

7. The computer-implemented method of claim 1, wherein processing the unconfirmed client account further comprises:

responsive to determining the origin of the unconfirmed client account to be a third party:

returning the immutable identification profile associated with the client to the subsequent content service application;

classifying the unconfirmed client account as a duplicitous account; and notifying the subsequent content service application of duplicitous account status.

8. The computer-implemented method of claim 1, wherein processing the unconfirmed client account further comprises:

responsive to determining the origin of the unconfirmed client account to be a third party:

facilitating disablement of the unconfirmed client account.

9. A computer program product comprising a computer readable storage medium having program instructions embodied therewith, the program instructions executable by a computing device to cause the computing device to:

facilitate creation of an immutable identification profile associated with a client in a context of a client-associated request to access a first content service application, the immutable identification profile comprising an immutable identification value and an immutable identification credential set;

receive notification of a client-associated request to access a subsequent content service application, wherein the subsequent content service application is not connected to aggregator service functionality;

facilitate aggregator service connection to the subsequent content service application, wherein an unconfirmed client account is created in association with the subsequent content service application;

process the unconfirmed client account, wherein the unconfirmed client account is processed by identifying the unconfirmed client using one or more detection techniques and determining an origin of the unconfirmed client account; and transmit the immutable identification profile associated with the client to the subsequent content service application based upon connectivity to the aggregator service functionality.

10. The computer program product of claim 9, wherein the program instructions further cause the computing device to:

attach the immutable identification profile associated with the client to content service application data related to the client, wherein the content service application data related to the client includes at least content from the first content service application and the subsequent content service application;

archive the content service application data related to the client based upon the immutable identification profile associated with the client, wherein the archiving of the content service application data includes merging authorship of the client with respect to the first content service application and the subsequent content service application; and responsive to a client-initiated search query, search the content service application data based upon the immutable identification profile associated with the client.

11. The computer program product of claim 9, wherein the program instructions to process the unconfirmed client account further cause the computing device to:

responsive to determining the origin of the unconfirmed client account to be the client:

apply a plurality of authentication factors to confirm identity of the client; and return the immutable identification profile associated with the client to the subsequent content service application.

12. The computer program product of claim 11, wherein the program instructions to process the unconfirmed client account further cause the computing device to:
- responsive to determining the origin of the unconfirmed client account to be the client:
  - reconcile any difference between an identification profile associated with the unconfirmed client account and the immutable identification profile associated with the client; and
  - attach the immutable identification profile associated with the client to the unconfirmed client account by facilitating replacement of the identification profile associated with the unconfirmed client account with the immutable identification profile associated with the client.

13. The computer program product of claim 9, wherein the program instructions to process the unconfirmed client account further cause the computing device to:
- responsive to determining the origin of the unconfirmed client account to be a third party:
  - return the immutable identification profile associated with the client to the subsequent content service application;
  - classify the unconfirmed client account as a duplicitous account; and
  - notify the subsequent content service application of duplicitous account status.

14. The computer program product of claim 9, wherein the program instructions to process the unconfirmed client account further cause the computing device to:
- responsive to determining the origin of the unconfirmed client account to be a third party:
  - facilitate disablement of the unconfirmed client account.

15. A system comprising:
- at least one processor; and
- a memory storing an application program, which, when executed on the at least one processor, performs an operation comprising:
  - facilitating creation of an immutable identification profile associated with a client in a context of a client-associated request to access a first content service application, the immutable identification profile comprising an immutable identification value and an immutable identification credential set;
  - receiving notification of a client-associated request to access a subsequent content service application, wherein the subsequent content service application is not connected to aggregator service functionality;
  - facilitating aggregator service connection to the subsequent content service application, wherein an unconfirmed client account is created in association with the subsequent content service application;
  - processing the unconfirmed client account, wherein the unconfirmed client account is processed by identifying the unconfirmed client using one or more detection techniques and determining an origin of the unconfirmed client account; and
  - transmitting the immutable identification profile associated with the client to the subsequent content service application based upon connectivity to the aggregator service functionality.

16. The system of claim 15, wherein the operation further comprises:
- attaching the immutable identification profile associated with the client to content service application data related to the client, wherein the content service application data related to the client includes at least content from the first content service application and the subsequent content service application;
- archiving the content service application data related to the client based upon the immutable identification profile associated with the client, wherein the archiving of the content service application data includes merging authorship of the client with respect to the first content service application and the subsequent content service application; and
- responsive to a client-initiated search query, searching the content service application data based upon the immutable identification profile associated with the client.

17. The system of claim 9, wherein the operation for processing the unconfirmed client account further comprises:
- responsive to determining the origin of the unconfirmed client account to be the client:
  - applying a plurality of authentication factors to confirm identity of the client; and
  - returning the immutable identification profile associated with the client to the subsequent content service application.

18. The system of claim 17, wherein the operation for processing the unconfirmed client account further comprises:
- responsive to determining the origin of the unconfirmed client account to be the client:
  - reconciling any difference between an identification profile associated with the unconfirmed client account and the immutable identification profile associated with the client; and
  - attaching the immutable identification profile associated with the client to the unconfirmed client account by facilitating replacement of the identification profile associated with the unconfirmed client account with the immutable identification profile associated with the client.

19. The system of claim 15, wherein the operation for processing the unconfirmed client account further comprises:
- responsive to determining the origin of the unconfirmed client account to be a third party:
  - returning the immutable identification profile associated with the client to the subsequent content service application;
  - classifying the unconfirmed client account as a duplicitous account; and
  - notifying the subsequent content service application of duplicitous account status.

20. The system of claim 15, wherein the operation for processing the unconfirmed client account further comprises:
- responsive to determining the origin of the unconfirmed client account to be a third party:
  - facilitating disablement of the unconfirmed client account.

\* \* \* \* \*